UNITED STATES PATENT OFFICE.

GEORGE FALCONER, OF FREMONT, NEBRASKA, ASSIGNOR TO UNIVERSAL GLAS-SOLVO COMPANY, OF CHAMBERLAIN, SOUTH DAKOTA, A CORPORATION.

COMPOSITION OF MATTER.

1,215,358.     Specification of Letters Patent.     Patented Feb. 13, 1917.

No Drawing.     Application filed March 13, 1916.    Serial No. 83,939.

*To all whom it may concern:*

Be it known that I, GEORGE FALCONER, a citizen of the United States, residing at Fremont, in the county of Dodge and State of Nebraska, have invented certain new and useful Improvements in a Composition of Matter, of which the following is a specification.

This invention relates to a composition of matter found to be of advantage in the operation of glass-cutting.

The principal object of the invention is to provide a composition of matter which may be applied to glass or other similar indurate, brittle or frangible substances to facilitate cutting, grinding or boring. A further object of the invention is to provide a composition of matter for the purposes described which will be in liquid form so that it may be conveniently applied to the surface to be ground or drilled, will not be conducive to fracture or cause discoloration of the glass or other substances when operated upon, and will be comparatively inexpensive in production.

These objects are attained by the use of potassium permanganate as an oxidizing agent in connection with bichlorid of mercury, a volatile oil being employed as a menstruum, the composition of matter having no effect upon glass except when abraded by an implement, such as a drill or grinding tool, and as a menstruum, oil of origanum is preferred.

The composition of matter preferably consists of the following ingredients in apothecary's weight: oil of origanum, 1 lb., potassium permanganate, 10 grains, and bichlorid of mercury, 5 grains, the two last named ingredients being dissolved in the oil of origanum, the resultant mixture being of liquid form, transparent, and somewhat volatile. It will be understood that certain changes may be made in the proportions of the ingredients, as expressed hereinafter in the appended claims.

In operation, for drilling holes in plate glass or the like, an ordinary steel or iron drill, when rotated, is all that is required, the end of the drill being lubricated with said composition of matter or liquid. The effect of the liquid on the glass is such that when the drill is rotated, the glass, or the parts thereof engaged or abraded by the drill and reached by said liquid will be reduced to a fine powder; and by use of said composition of matter and the common type of drills mentioned, holes of any desired diameter may be quickly bored in the heavier kinds of plate glass or in attenuated, fragile glass, or similar articles, said holes being near together or far apart as may be desired, the walls of the holes being rectilinear and polished, and without causing discoloration, fracture or injury to the glass and without causing appreciable wear of the drills.

For grinding glass, the liquid is applied generally to the periphery of an emery wheel or other similar rotatable implement, and it may be applied conveniently to any concaved, convexed or flat surfaces of implements requiring longitudinal reciprocation for operation in glass grinding or scouring, it only being necessary that the said composition of matter shall be in contact with the surface which is to be ground or abraded and also in contact with the cutting or grinding surface of the implement. Since the composition of matter is comparatively inexpensive, and since common or ordinary implements may be employed in its use, the labor and expense in glass cutting, grinding and boring are reduced to a minimum.

Another advantage in the use of the herein described composition of matter is the fact that threads may be conveniently cut in the walls of the apertures after the boring has been effected, by use of an ordinary threaded tap, it only being necessary to apply a limited quantity of the liquid to the threaded part or spiral ridges of the drill before said operation. For purposes of shaping or for boring holes in marble or ivory, said composition of matter has been found to be of advantage since the work may be greatly expedited and it does not operate in a manner to discolor the material or cause fracture.

In the operation of boring, especially of glass, care should be exercised, so that the liquid will be applied to the surface operated upon, otherwise the drill or its blade will be injured, but no injury will occur to the drill so long as the surface of the glass is supplied with a coating or lubrication of said liquid; and in the operation of cutting or grinding, no injury will be sustained by any of the implements employed, if there is a similar lubrication of parts.

While oil of origanum is preferred, other volatile oils may be substituted therefor, and may be used with the potassium permanganate and mercury, and therefore it will be appreciated that the scope of the invention should be considered as including all of the means herein disclosed, and which accomplish a useful result.

It should be stated that if the proportions are so changed that a greater quantity than 10 grains of potassium permanganate and a greater quantity than 5 grains of bichlorid of mercury are deposited in a receptacle with one pound of oil of origanum, the excess will not be dissolved, since one pound of oil of origanum will not assimilate said excess. However, the composition of matter thus provided or the part thus dissolved and assimilated will be useful and fully effective for the purposes mentioned. If less than 10 grains of potassium permanganate and less than 5 grains of bichlorid of mercury are employed with the one pound of oil of origanum, the resulting composition of matter will be less effective in operation, and for the reasons given the proportions first mentioned are preferred.

Having fully described my invention, what I claim as new and desire to secure by Letters Patent is,—

1. The herein described composition of matter, comprising, in apothecary's weight, potassium permanganate 10 grains, and bichlorid of mercury 5 grains, dissolved in approximately 1 pound of oil of origanum.

2. A composition of matter comprising, in apothecary's weight, approximately 1 to 10 grains of potassium permanganate, and approximately 1 to 5 grains of bichlorid of mercury, dissolved in 1 pound of oil of origanum.

3. The herein described composition of matter comprising approximately 10 grains of potassium permanganate, 5 grains of bichlorid of mercury, and volatile oil, the quantity of said volatile oil being sufficient to cause the potassium permanganate and bichlorid of mercury to dissolve when placed therein.

4. A composition of matter comprising approximately in weight 1 to 10 grains of potassium permanganate and 1 to 5 grains of bichlorid of mercury dissolved in approximately 1 pound of volatile oil.

In testimony whereof I have affixed my signature in presence of two witnesses.

GEORGE FALCONER.

Witnesses:
 HIRAM A. STURGES,
 BENJ. F. WHEELER.